(12) United States Patent
Madlener et al.

(10) Patent No.: US 12,385,223 B1
(45) Date of Patent: Aug. 12, 2025

(54) METHOD FOR CONTROLLING AN ELECTRIC DRIVETRAIN OF A WORK MACHINE, AND CORRESPONDING CONTROL DEVICE

(71) Applicant: ZF FRIEDRICHSHAFEN AG, Friedrichshafen (DE)

(72) Inventors: Matthias Madlener, Hohentengen (DE); Stephan Schinacher, Egesheim (DE); Jürgen Legner, Friedrichshafen (DE); Werner Denk, Mauth (DE); Andreas Rothmund, Hohentengen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 19/112,271

(22) PCT Filed: Sep. 21, 2023

(86) PCT No.: PCT/EP2023/076097
§ 371 (c)(1),
(2) Date: Mar. 17, 2025

(87) PCT Pub. No.: WO2024/068432
PCT Pub. Date: Apr. 4, 2024

(30) Foreign Application Priority Data

Sep. 26, 2022 (DE) ............ 10 2022 210 110.3

(51) Int. Cl.
*E02F 9/20* (2006.01)
*E02F 9/24* (2006.01)

(52) U.S. Cl.
CPC ............ *E02F 9/2083* (2013.01); *E02F 9/207* (2013.01); *E02F 9/24* (2013.01)

(58) Field of Classification Search
CPC ............ E02F 9/2083; E02F 9/207; E02F 9/24
See application file for complete search history.

(56) References Cited

U.S. PATENT DOCUMENTS

| 11,390,172 B2* | 7/2022 | Park ............ B60L 15/20 |
| 2013/0109536 A1 | 5/2013 | Schneider |
| 2020/0156480 A1* | 5/2020 | Park ............ B60L 15/2045 |

FOREIGN PATENT DOCUMENTS

| DE | 102009000111 A1 | 7/2010 |
| DE | 102018203624 A1 | 9/2019 |
| WO | WO 2015098545 A1 | 7/2015 |

* cited by examiner

*Primary Examiner* — Tyler J Lee
(74) *Attorney, Agent, or Firm* — LEYDIG, VOIT & MAYER, LTD.

(57) ABSTRACT

A method of controlling an electric drivetrain of a work machine, the method including determining whether a brake pedal actuation has occurred with an actuation distance greater than an actuation distance threshold value for an actuation duration longer than an actuation duration threshold value. The method further includes determining whether no drive torque maintaining condition exists, based on a determination that the brake pedal actuation occurred with the actuation distance greater than the actuation distance threshold value for the actuation duration longer than the actuation duration threshold value. The method further includes generating a control signal for the electric drivetrain to disable a torque generation by the electric drivetrain based on a determination that no drive torque maintaining condition exists.

15 Claims, 2 Drawing Sheets

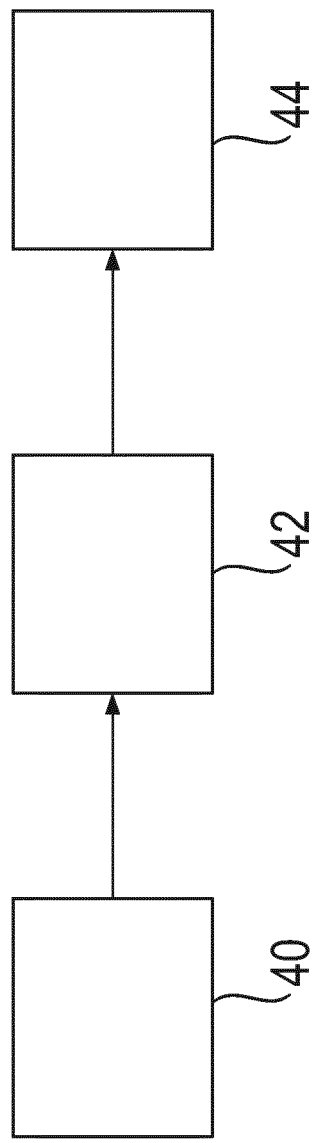

METHOD FOR CONTROLLING AN ELECTRIC DRIVETRAIN OF A WORK MACHINE, AND CORRESPONDING CONTROL DEVICE

CROSS REFERENCE TO RELATED APPLICATIONS

This application is a U.S. National Phase application under 35 U.S.C. § 371 of International Application No. PCT/EP2023/076097, filed on Sep. 21, 2023, and claims benefit to German Patent Application No. DE 10 2022 210 110.3, filed on Sep. 26, 2022. The International Application was published in German on Apr. 4, 2024 as WO 2024/068432 A1 under PCT Article 21(2).

FIELD

The present invention relates to a method for controlling an electric drivetrain of a work machine, an electric drivetrain of a work machine and to a work machine.

BACKGROUND

In conventional drivetrains for work machines with combustion engines, a torque transmission interruption is usually available through a clutch. In the event of a panic braking by a driver of the work machine, this clutch can be opened immediately. As a result, torque is no longer transmitted from the drivetrain to an output. Thus, for example, respective wheels are disconnected from a motor shaft of the work machine. This also ensures that the work machine can be safely braked to a standstill even in the event of a fault.

Due to the electrification of work machines, such a mechanical torque transmission interruption may no longer be possible. Additionally, the control behavior of electrified work machines can also be different from that of work machines with an internal combustion engine. For example, a brake can be applied more frequently and alternatively or additionally more strongly to recover energy through a recuperation, thereby increasing the efficiency in the use of the work machine. This should not result in an undesirable interruption of torque transmission. In case of emergency, however, it should still be ensured that a torque transmission interruption occurs.

SUMMARY

In an embodiment, the present disclosure provides a method of controlling an electric drivetrain of a work machine, the method comprising determining whether a brake pedal actuation has occurred with an actuation distance greater than an actuation distance threshold value for an actuation duration longer than an actuation duration threshold value. The method further comprises determining whether no drive torque maintaining condition exists, based on a determination that the brake pedal actuation occurred with the actuation distance greater than the actuation distance threshold value for the actuation duration longer than the actuation duration threshold value. The method further comprises generating a control signal for the electric drivetrain to disable a torque generation by the electric drivetrain based on a determination that no drive torque maintaining condition exists.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 2 schematically illustrates a method for controlling a drivetrain of a work machine.

DETAILED DESCRIPTION

Figure 1:
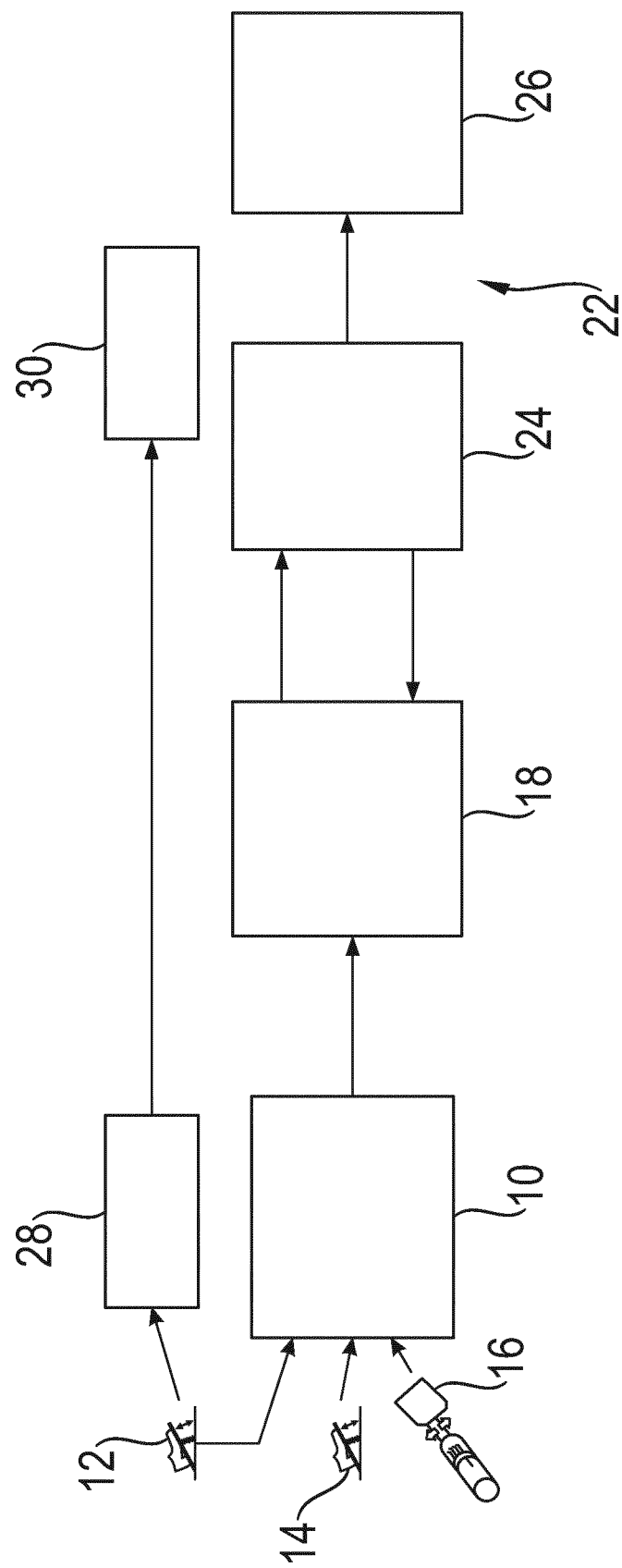
FIG. 1 schematically illustrates a control of an electric drivetrain of a work machine.

An embodiment of the present disclosure provides a method for controlling an electric drivetrain of a work machine. The method can, for example, be carried out by a control device for the electric drivetrain of the work machine. The control device can, for example, be integrated into an inverter, which supplies an electric motor of the drivetrain with electrical energy. A work machine can, for example, be configured as an agricultural machine, e.g. a tractor, a construction machine or also a special vehicle. The work machine can be configured as a vehicle. The drivetrain can be configured to provide drive power for the working machine at an output, such as the respective driven wheels. Optionally, the drivetrain can additionally be configured to provide a power take-off. The drive power can be used to drive the work machine. With the power take-off, a tool of the work machine, such as an adjustable shovel or a hydraulic pump, can be supplied with power.

An electric drivetrain can have an electric motor, which has a motor shaft for providing drive power to the work machine. The electric motor can, for example, be configured to supply the drivetrain of the work machine with power. The drivetrain can have an energy source for operating the electric motor of the drivetrain. For example, the drivetrain can have a battery that is configured to provide electrical energy for the electric motor. The electric motor can be configured to convert electrical energy into mechanical energy. Optionally, an electric motor can also be configured for recuperation, in which mechanical energy can be converted into electrical energy. An electric motor can, for example, be configured as a synchronous motor or asynchronous motor.

The work machine can have a brake system. The brake system can be controlled by a brake pedal. When actuated, the brake system can have a decelerating effect on an output of the drivetrain and alternatively or additionally on the work machine. The brake system can, for example, have disk brakes or drum brakes on the respective axles of the work machine. The brake system can, for example, be configured for mechanical, hydraulic or even electrical actuation.

The method has a step of determining whether a brake pedal actuation has occurred with an actuation distance greater than an actuation distance threshold value for an actuation duration longer than an actuation duration threshold value. A corresponding sensor can be provided for this purpose. Respective sensor signals can, for example, be evaluated by a microcontroller, which can be configured as part of the control device. The brake pedal can be an actuating element by means of which a driver of the work machine can set a brake force. The brake pedal can be configured for an actuation using the driver's foot. The brake pedal can also be configured for operation with a hand, for example as a lever. For determining, a position of the brake pedal can be detected. The actuation distance can correspond to a deflection of the brake pedal. The actuation distance can be a distance and alternatively or additionally an angle relative to an unactuated position of the brake pedal. For example, a deflection of the brake pedal from an unactuated position, in particular as a percentage of a maximum actuation, can be ascertained. The actuation duration can be a time period during which the brake pedal is actuated. For example, the actuation duration can be a time period during which the brake pedal was actuated at least further than the actuation distance threshold value. The actuation distance threshold value can be a minimum actuation distance. The actuation duration threshold value can be a minimum actuation duration.

For example, it can be determined whether the brake pedal has been actuated with an actuation distance greater than 99% of a maximum actuation distance for an actuation duration longer than 500 ms. Through the corresponding check, it can be ensured that only actual panic braking is taken into account. Unintentional actuations of the brake pedal with an actuation distance greater than the actuation distance threshold value usually take place for a shorter period of time, for example. Such unintentional actuation can occur, for example, due to vibrations of the work machine, fluctuations of the driver and alternatively or additionally a low pedal actuation resistance.

The method includes a step of determining whether no drive torque maintaining condition exists when it has been determined that the brake pedal actuation has occurred with the actuation distance greater than the actuation distance threshold value for the actuation duration longer than the actuation duration threshold value. This step of determining can therefore only be carried out, for example, if it was previously determined that the driver is actually performing a panic braking. This means that the computational effort for this further determination of whether there is no drive torque maintaining condition can be low. The effort for the procedure can thus be minimal. For determining whether no drive torque maintaining condition exists, for example, respective drivetrain control signals, drivetrain state signals, and alternatively or additionally vehicle state signals can be ascertained. A drive torque maintaining condition can be a specific driving state and, alternatively or additionally, a drivetrain state.

By taking into account one or more drive torque maintaining conditions, an embodiment prevents the work machine from undesirably no longer generating torque despite a strong and long brake pedal actuation. For example, the electric drivetrain can also recuperate during emergency braking and thus contribute to deceleration. In addition, it can be necessary for the driver to perform a certain action, such as switching out of a safety mode or restarting the vehicle, after torque generation is disabled. If the torque generation was disabled undesirably, this can lower operating comfort. This can thus be prevented accordingly, although a safe and quick stop can still be performed in the event of a fault.

The method has a step of generating a control signal for the drivetrain to disable torque generation by the electric drivetrain when it has been determined that no drive torque maintaining condition exists. This makes it possible to switch to a torque-free state. The control signal can be used to switch to a safety mode of the drivetrain. In the safety mode, at least in terms of functional safety, it can be guaranteed for example, that the drivetrain no longer provides any driving torque at the output. In the safety mode, a drive torque can remain zero regardless of the actuation of respective driving pedals, until the safety mode is deactivated again and alternatively or additionally switched to a normal mode.

The method can include a step of transmitting the control signal to the drivetrain. For example, the control signal can be transmitted to one or all inverters of the drivetrain.

In an embodiment of the method, it is provided that the determining of whether the brake pedal actuation with the actuation distance greater than the actuation distance threshold value has occurred for the actuation duration longer than the actuation duration threshold value only takes place if a vehicle speed is higher than a threshold value speed. The threshold speed can be a minimum driving speed of the work machine. If the vehicle speed is lower than the threshold speed, mechanical braking power can always be sufficient to bring the work machine to a standstill. Accordingly, disabling the torque generation can be unnecessary. For example, this can also avoid the need to switch to safety mode, which can make the work machine easier to operate. The threshold speed can, for example, be a speed higher than a speed of zero. The method can comprise a step of determining whether the vehicle speed is faster than the threshold speed. The method can comprise a step of ascertaining the vehicle speed.

In an embodiment of the method, it is provided that the determining of whether there is no drive torque maintaining condition only takes place until the brake pedal actuation takes place with an actuation distance smaller than a further actuation distance threshold value for an actuation duration longer than a further actuation duration threshold value. The further actuation distance threshold value can be smaller than the previously described actuation distance threshold value, for example by 5% of a maximum actuation distance. The further actuation duration threshold value can be identical, shorter or longer than the previously described actuation duration threshold value. If, for example, the driver presses the brake pedal less strongly again for a minimum duration, it will only be monitored whether such strong braking occurs again that disabling the torque generation by the drivetrain would be sensible. This means that permanent monitoring of the drive torque maintaining conditions can be avoided, which can keep the computing effort low. Additionally, an undesired disabling and switching to a safety mode can be avoided when the driver is no longer performing panic braking and one of the drive torque maintaining conditions was met during the panic braking period. For example, drive torque maintaining conditions are only checked as soon as the driver has depressed the brake pedal one time to at least 95% of the maximum actuation distance for at least 500 ms, and this check of the drive torque maintaining conditions ends as soon as the driver has depressed the brake pedal to a maximum of 94% of the maximum actuation distance for at least 500 ms. Then it is again only determined whether brake pedal actuation occurs again with the actuation distance greater than the actuation distance threshold value for an actuation duration longer than the actuation duration threshold value. The method can therefore return to its starting point, for example, if the brake pedal is actuated with an actuation distance less than the further actuation distance threshold value for an actuation duration longer than the further actuation duration threshold value. By taking into account the additional actuation distance threshold value and the additional actuation duration threshold value, it can also be avoided that short-term brake pedal fluctuations and thus a slight reduction in the actuation distance, for example due to vibration or a driver's preparation for a collision, prevent a necessary drive torque disablement.

In an embodiment of the method, it is provided that a first drive torque maintaining condition is fulfilled when an output speed decreases. An output speed can be a rotational speed at an output shaft of the drivetrain. An output speed can be a rotational speed of the motor shaft of the electric motor. An output speed can be a rotational speed at a driven wheel or a driven axle of the work machine. Thus, no disablement of torque generation occurs if the work machine decelerates. This means that disablement of torque generation can only occur, for example, when the braking force from a braking system is no longer sufficient to decelerate the work machine to a standstill. If deceleration occurs, for example also because the drivetrain decelerates the work machine through recuperation, the torque generation cannot be disabled. Additionally, the disablement of torque generation can only occur, for example, when due to a fault, the drivetrain and alternatively or additionally the electric motor generate a driving torque that is stronger than the maximum deceleration provided by the braking system.

Alternatively or additionally, the first drive torque maintaining condition or a further drive torque maintaining condition can be fulfilled if a deceleration of the work machine is less than a threshold deceleration value. A speed gradient must then have a minimum value, for example, to prevent the torque generation from being disabled. This takes into account that although the output speed decreases, it does so at too low a rate. As a result, potentially unsafe driving conditions can be avoided due to insufficient deceleration and thus too slow reduction in driving speed.

In an embodiment of the method, it is provided that a second drive torque maintaining condition is fulfilled when the work machine is stationary. For example, the work machine is stationary when the driving speed is zero. This makes it possible to avoid switching to a safety mode, since panic braking, for example, is unnecessary when the work machine is stationary.

In an embodiment of the method, it is provided that a third drive torque maintaining condition is fulfilled if an output torque does not act in an accelerating direction. Alternatively or additionally, the third drive torque maintaining condition is fulfilled if the drive torque is less than an acceleration torque threshold value. As a result, operation of the drivetrain can be maintained, for example, when the drivetrain recuperates and alternatively or additionally only generates a negligible torque. For example, the drive torque acts in an accelerating direction when it acts in the current driving direction. The output torque can be a torque generated by the drivetrain at the output of the drivetrain. The acceleration torque threshold can be a maximum permissible accelerating drive torque at which the torque generation is not disabled.

In an embodiment of the method, it is provided that a fourth drive torque maintaining condition is fulfilled when a state of an inverter of the drivetrain is not a drive state. The state of the inverter can be reported by the inverter to a vehicle control for functional safety. The inverter can, for example, have a recuperating state, the drive state or a disablement state. The drive state can be a state in which electrical energy is transmitted from an energy storage to the electric motor via the inverter to generate torque. This way, the power supply through the inverter can already be taken into account in order to avoid undesired further torque generation. For example, an error can be taken into account in which the inverter remains in the drive state despite other control signals. The state of the inverter can be, for example, the last stored state and alternatively or additionally a current state that can be retrieved.

In an embodiment of the method, it is provided that the control signal generated specifies a target torque of 0 Nm for the drivetrain. The generated control signal can, for example, control the inverter. Such a control signal can be used to directly command the torque generation to zero and thus be disabled. The target torque can be the torque that the drivetrain is to generate.

In an embodiment of the method, it is provided that the generated control signal specifies a disablement state for the inverter. The disablement state can be a state in which torque generation by the drivetrain is no longer physically possible. The disablement state can be a state in which, for example, the respective output stages of the inverter are open. This means that the electric motor can no longer be supplied with electrical energy from the inverter. By specifying the disablement state, the torque generation can be disabled with a particularly high level of safety, even in the event of faults.

In an embodiment of the method, it is provided that the control signal generated specifies a gradual reduction of a drive torque for the drivetrain. For example, the control signal can specify the time period in which the generated torque is reduced to zero. The gradual reduction can only take place, for example, if a drive torque was still required at the time of torque disablement. By means of the gradual reduction, the respective electronic components of the drivetrain can be protected from damage. Nevertheless, the gradual reduction can still occur quickly enough so that the deceleration speed of the work machine is not or only insignificantly reduced.

In an embodiment of the method, it is provided that the generated control signal specifies an abrupt reduction of a drive torque for the drivetrain. For example, a torque generation of 0 Nm can be commanded immediately. Through this abrupt reduction, the method can be implemented particularly easily and can be used simply in different work machines.

An embodiment provides a control device for an electric drivetrain of a work machine. The control device can, for example, be configured to transmit control signals to respective inverters of the drivetrain. The control device can also be integrated in respective inverters of the drivetrain. The control device can be configured as an electronic component and can have a microcontroller, for example. The control device can be configured to carry out the method according to other embodiments. Respective further features, embodiments, and advantages can be found in the descriptions of various embodiments.

The control device is configured to determine that a brake pedal actuation with an actuation distance greater than an actuation distance threshold value has taken place for an actuation duration longer than an actuation duration threshold value. The control device can have respective sensors for this purpose. The control device can be configured to receive respective actuation signals of the brake pedal.

The control device is configured to determine that there is no drive torque maintaining condition when it has been determined that the brake pedal actuation has occurred with the actuation distance greater than the actuation distance threshold value for the actuation duration longer than the actuation duration threshold value. The control device is also configured to generate a control signal for disabling a torque generation by the electric drivetrain when it has been determined that no drive torque maintaining condition exists. The control device can have a storage device in which respective threshold values and alternatively or additionally drive torque maintaining conditions can be stored.

An embodiment provides a work machine with an electric drivetrain and a control device. The drivetrain is configured to receive the control signal generated by the control device. The control device can be configured as a control device according to other embodiments. The electric drivetrain can be configured to be controlled by the method according to other embodiments. Respective further features, embodiments and advantages can be found in the descriptions of the embodiments.

In an embodiment of the work machine, it is provided that the electric drivetrain includes an inverter and an electric motor that can be supplied with electrical energy by the inverter. The inverter my feature power electronics. The drivetrain can include an energy source, such as a battery. The inverter can be configured to control an energy supply of the electric motor based on the control signal received from the control device. The work machine can also include the brake pedal.

In an embodiment of the work machine, it is provided that the drivetrain is free from a clutch by which a tractive force interruption is made possible. An interruption in tractive force can be a state in which no torque transmission from the electric motor to an output of the drivetrain or, for example, respective wheels of the work machine is possible due to an open clutch. Despite the lack of possibility to interrupt the tractive force, it can still be reliably ensured that no driving of the work machine occurs in the event of panic braking or that it can at least still be brought safely to a stop.

FIG. 1 schematically illustrates control of an electric drivetrain 22 of a work machine. The work machine has an evaluation device 10. This evaluation device 10 receives a pedal position of a brake pedal 12 and a speed controller, which is configured as an accelerator pedal 14. Additionally, the position of a mode change element in the form of a driving range selector lever 16 is also received. The position signals are transmitted from the evaluation device 10 to a control device 18 via a CAN bus. The control device 18 uses these inputs to generate control signals for the drivetrain 22, which are transmitted to an inverter 24 of the drivetrain 22 and correspond to a driving strategy with a torque specification determined by the control device 18. The control signals are also used by the control device 18 to control a transmission of the drivetrain 22. The inverter 24 supplies an electric motor 26 with electrical energy depending on the control signals. This controls the torque generation of the drivetrain 22. The generated torque is made available at an output of the drivetrain 22 to drive the respective wheels of the work machine.

In addition, the work machine has a brake system which is controlled by the brake pedal 12. In the example shown, the brake system has a mechanical or hydraulic transmission device 28, by means of which a disk brake 30 is actuated depending on the actuation of the brake pedal 12. In a purely mechanical brake system, the brake force is controlled directly via a muscle force acting on the brake pedal 12.

The control device 18 is also configured to carry out a method for controlling the electric drivetrain 22, by means of which a torque generation by the drivetrain 22 is disabled in the event of panic braking. An embodiment of this method is schematically illustrated in FIG. 2.

In a step 40, it is determined whether a brake pedal actuation of the brake pedal 12 has occurred with an actuation distance greater than an actuation distance threshold value for an actuation duration longer than an actuation duration threshold value. In the example illustrated, the actuation travel threshold value is 99% of a maximum actuation of the brake pedal 12 and the actuation duration threshold value is 500 ms. Therefore, if the driver of the work machine depresses the brake pedal 12 almost completely for at least half a second, it is determined that the brake pedal has been actuated with an actuation distance greater than the actuation distance threshold value for an actuation duration longer than the actuation duration threshold value. In this case, it can be assumed that the driver has not unintentionally depressed the brake pedal 12 strongly for a short time, for example due to a vehicle jolt, but actually wants to command a strong braking action to bring the work machine to a standstill as quickly as possible.

If there is no brake pedal actuation with an actuation distance greater than the actuation distance threshold value for a period longer than the actuation duration threshold value, the brake pedal actuation continues to be monitored. Only if such a brake pedal actuation occurs, the process continues with a step 42. In step 42, it is determined whether no drive torque maintaining condition exists, if it was determined in step 42 that the brake pedal actuation with the actuation distance greater than the actuation distance threshold value has occurred for the actuation duration longer than the actuation duration threshold value.

Thereby the control device 18 takes into account one, several or all of the following drive torque maintaining conditions: A first drive torque maintaining condition is fulfilled when an output speed is reduced. A second drive torque maintaining condition is fulfilled when the work machine is stationary, i.e. does not perform any driving movement. A third drive torque maintaining condition is fulfilled if an output torque does not act in an accelerating direction or is less than an acceleration torque threshold value. A fourth drive torque maintaining condition is fulfilled if a state of the inverter 24 of the drivetrain 22 is not a drive state. For this purpose, the state of the inverter 24 is transmitted from the inverter 24 to the control device 18. By taking these drive torque maintaining conditions into account, unnecessary disablement of the torque generation of the drivetrain 22 can be avoided, for example in situations in which the drivetrain 22 contributes to decelerating the driving movement of the work machine.

Before step 40 and alternatively or additionally step 42, in an embodiment it will be additionally checked whether a vehicle speed is higher than a threshold speed. Only if the vehicle speed is higher than the threshold speed is step 40 and alternatively or additionally step 42 of the method carried out in this embodiment. For this purpose, an actual speed of the electric motor 26 and alternatively or additionally of the output of the drivetrain 22 can be transmitted to the control device 18 by the inverter 24.

In an embodiment, the drive torque maintaining conditions are monitored until the brake pedal 12 is actuated with an actuation distance less than a further actuation distance threshold value for an actuation duration longer than a further actuation duration threshold value. For example, the drive torque maintaining conditions are monitored until the driver actuates the brake pedal 12 with at most 94% of its maximum actuation distance for at least 500 ms. The system then returns to step 40.

If in step 42 it was determined that no drive torque maintaining condition exists, the process continues with step 44. In step 44, a control signal is generated for the drivetrain 22 to disable torque generation by the electric drivetrain 22. The control signal is transmitted to the inverter 24. The control signal specifies a target torque of 0 Nm for the inverter 24. The inverter 24 then no longer supplies the electric motor 26 with electric current, for example, which is sufficient for torque generation. Alternatively or additionally, a disablement state for the inverter 24 is specified by the control signal, whereby the inverter 24 opens its respective output stages in response. The inverter 24 is then electrically disconnected from the electric motor 26.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS

- 10 evaluation device
- 12 brake pedal
- 14 accelerator pedal
- 16 driving range selector lever
- 18 control device
- 22 electric drivetrain
- 24 inverter
- 26 electric motor
- 28 mechanical or hydraulic transmission device
- 30 disk brake
- 40 step of determining a brake pedal actuation
- 42 step of checking drive torque maintaining condition
- 44 step of generating a control signal

The invention claimed is:

1. A method of controlling an electric drivetrain of a work machine, wherein the method comprises at least the following steps:
   determining whether a brake pedal actuation has occurred with an actuation distance greater than an actuation distance threshold value for an actuation duration longer than an actuation duration threshold value;
   determining whether no drive torque maintaining condition exists, when it was determined that the brake pedal actuation was performed with the actuation distance greater than the actuation distance threshold value for the actuation duration longer than the actuation duration threshold value;
   generating a control signal for the electric drivetrain to disable a torque generation by the electric drivetrain when it was determined that no drive torque maintaining condition exists.

2. The method according to claim 1, wherein determining whether the brake pedal actuation has occurred with the actuation distance greater than the actuation distance threshold value for the actuation duration longer than the actuation duration threshold value only takes place if a vehicle speed is higher than a threshold value speed.

3. The method according to claim 1, wherein determining whether no drive torque maintaining condition exists only takes place until the brake pedal actuation occurs with an actuation distance smaller than a further actuation distance threshold value for an actuation duration longer than a further actuation duration threshold value.

4. The method according to claim 1, wherein a first drive torque maintaining condition is fulfilled when an output speed decreases.

5. The method according to claim 1, wherein a second drive torque maintaining condition is fulfilled when the work machine is stationary.

6. The method according to claim 1, wherein a third drive torque maintaining condition is fulfilled when an output torque does not act in an accelerating direction or is smaller than an acceleration torque threshold value.

7. The method according to claim 1, wherein a fourth drive torque maintaining condition is fulfilled when a state of an inverter of the electric drivetrain is not a drive state.

8. The method according to claim 1, wherein the generated control signal specifies a target torque of 0 Nm for the electric drivetrain.

9. The method according to claim 1, wherein the generated control signal specifies a disablement state for an inverter.

10. The method according to claim 1, wherein the generated control signal specifies a gradual reduction of a drive torque for the electric drivetrain.

11. The method according to claim 1, wherein the generated control signal specifies an abrupt reduction of a drive torque for the electric drivetrain.

12. A control device for an electric drivetrain of a work machine, wherein the control device is configured to determine that brake pedal actuation with an actuation distance greater than an actuation distance threshold value has occurred for an actuation duration longer than an actuation duration threshold value,
   wherein the control device is configured to determine that no drive torque maintaining condition exists when it has been determined that the brake pedal actuation with the actuation distance greater than the actuation distance threshold value has occurred for the actuation duration longer than the actuation duration threshold value, and
   wherein the control device is configured to generate a control signal for disabling torque generation by the electric drivetrain when it has been determined that no drive torque maintaining condition exists.

13. A work machine, comprising:
   an electric drivetrain; and
   the control device according to claim 12,
   wherein the electric drivetrain is configured to receive the control signal generated by the control device.

14. The work machine according to claim 13, wherein the electric drivetrain has an inverter and an electric motor configured to be supplied with electrical energy by the inverter, wherein the inverter is configured to control an energy supply to the electric motor depending on the control signal received from the control device.

15. The work machine according to claim 13, wherein the electric drivetrain is free of a clutch by which an interruption of a tractive force is made possible.

* * * * *